United States Patent [19]

Matsuoka et al.

[11] 4,109,387
[45] Aug. 29, 1978

[54] POSITION DETECTING APPARATUS

[75] Inventors: Noboru Matsuoka, Eniwa; Kengo Sugiyama, Abiko, both of Japan

[73] Assignee: Hitachi, Ltd., Japan

[21] Appl. No.: 755,129

[22] Filed: Dec. 29, 1976

[51] Int. Cl.$^2$ .................. G01B 7/31; G01B 7/315
[52] U.S. Cl. .................. 33/185 V; 33/180 AT; 33/181 AT; 29/273
[58] Field of Search ....... 33/185 V, 180 AT, 181 AT, 33/203, 203.12, 203.13, 203.14, 203.15, 203.18; 29/407, 464, 468, 802, 273

[56] References Cited

U.S. PATENT DOCUMENTS

| 3,389,453 | 6/1968 | Tarter et al. | 29/273 |
| 4,011,659 | 3/1977 | Horuallius | 33/180 AT |

*Primary Examiner*—Richard E. Aegerter
*Assistant Examiner*—Willis Little
*Attorney, Agent, or Firm*—Craig & Antonelli

[57] ABSTRACT

An apparatus for detecting the position of the center of rotation of a hub of each wheel of a vehicle, the hub having secured thereto a plurality of laterally extending hub bolts. The apparatus comprises a position-correcting member movable toward and away from the hub bolts so as to be capable of coming into engagement with a first one of the hub bolts and to rotate the hub until a second one of the hub bolts adjacent to the one hub bolt comes into engagement with the position-correcting member, thereby to adjust the angular position of the hub bolts to a desired orientation. There is further provided a position detector movable along the correcting member toward the first and second hub bolts in engagement with the correcting member until it comes into engagement with one of these hub bolts, thereby to detect the position of the contacted hub bolt. The position of the center of rotation of the hub is calculated on the basis of the amounts of displacements of the correcting member and the detector.

7 Claims, 13 Drawing Figures

F I G. 6
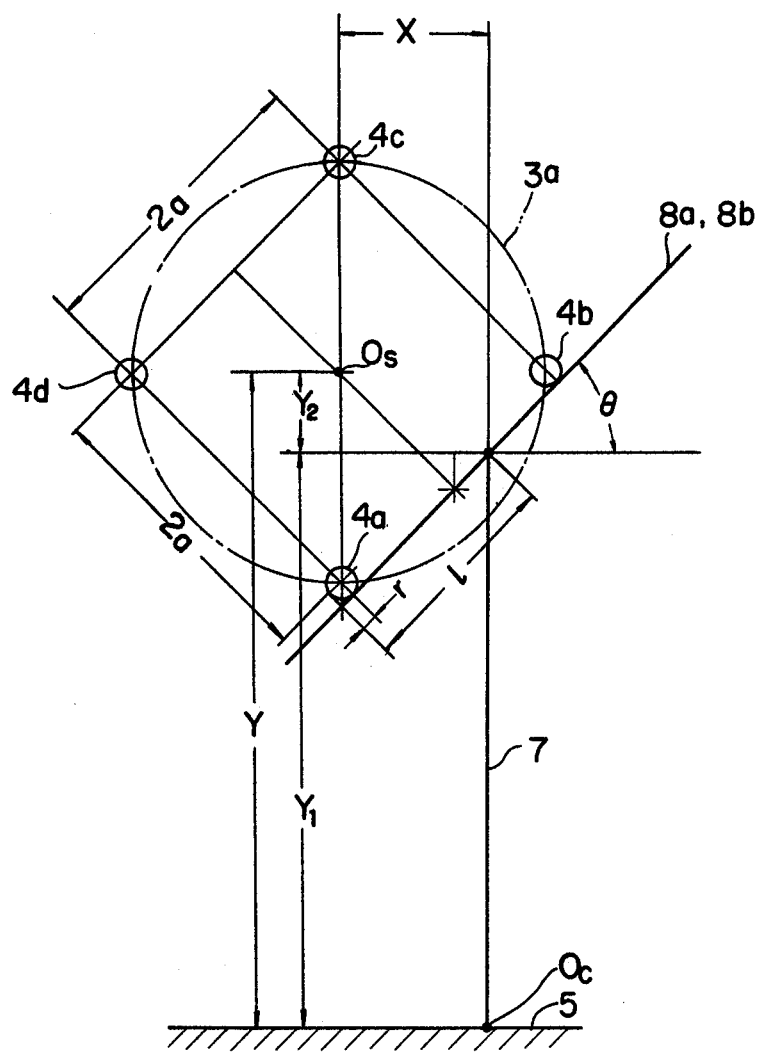

POSITION DETECTING APPARATUS

BACKGROUND OF THE INVENTION

1. Field of the Invention

This invention relates to position detecting apparatus having particular utility in self-operating machinery, and more particularly the invention is concerned with a position detecting apparatus which is adapted for use in an operation involving rotating objects of operation, particularly in an operation for mounting wheels onto vehicle hubs in a motor vehicle production line.

2. Description of the Prior Art

In a motor vehicle production line, a wheel mounting operation for mounting wheels onto vehicle hubs and a nut tightening operation for screwing nuts into bolts for fastening the wheels in position after the wheels have been mounted onto the hubs are performed. These operations have hitherto been performed by relying on human brains and labor. These operations will be described more in detail. A wheel is raised by means of a winch or by the hands of the operator and then hub bolts threadably connected to one of the vehicle hubs are inserted into holes formed in the wheel for receiving the hub bolts therein. Thereafter nuts are screwed into the hub bolts as by an impact wrench. In performing the wheel mounting and nut tightening operations, difficulty is encountered for positioning the hub bolts such that they are brought into index with the holes in the wheel for receiving the hub bolts, because the angularly rotated positions of the hub bolts about the axle undergo changes due to the rotation of the hub. Also, when the nuts are tightened on the hub bolts, the operator is subjected to the vibration and noise produced by the impact wrench used to perform the operation. Moreover, the operator must perform the operation of raising the wheel which is heavy, with the result that the operator must bear a heavy burden. Therefore, in order to free the operator from the heavy burden, there has been a demand for automating the wheel mounting operation.

Apparatus designed for automating the wheel mounting operation are disclosed, for example, in the specification of Japanese O.P.I. Publication (laid open to public inspection) No. 78054/75, the specification of Japanese Patent Publication No. 24785/75 and a paper entitled "An Application of Computer Vision to a Simulated Assembly Task" which has been submitted to the First International Joint Conference on Pattern Recognition, 1973, held in Washington, D.C., U.S.A. In performing the operation of mounting wheels on vehicle hubs not only by means of these apparatus but also by other apparatus, the most important problem that is generally encountered is how to carry out positioning of the parts relative to each other for accomplishing the object of assembling or positioning of the hub bolts secured to a hub relative to the holes formed in the wheel for inserting the bolts therein.

The systems for detecting positions in order to accomplish positioning can be broadly divided into a non-contact system and a contact system. The aforementioned three apparatus all belong to the non-contact system. Apparatus of this system have disadvantages in that it is impossible to accomplish positioning with a high degree of precision and that it is impossible to obtain a cycle time which is fit for practical use.

SUMMARY OF THE INVENTION

An object of this invention is to provide a position detecting apparatus which enables the operations of correcting the position of an object of operation and detecting the position in a short period of time and which permits position detection to be effected with a high degree of precision.

Another object is to provide a position detecting apparatus which has particular utility in performing correction of positions of hub bolts of a motor vehicle and detection of the position of the center of rotation of each of the vehicle hubs which are operations that must be performed in mounting wheels onto vehicle hubs in a motor vehicle production line.

The aforementioned objects of the invention can be accomplished by an apparatus for detecting the position of the center of rotation of a rotary surface having secured thereto a plurality of projections disposed on a concentric pitch circle in said rotary surface and angularly equidistantly spaced apart from each other, the plurality of projections extending substantially at right angles to the rotary surface, comprising: reciprocally movable correcting means for correcting the angular positions of the projections; a first drive means drivingly connected to the correcting means for reciprocating the correcting means, said first drive means being operative to advance the correcting means into contact with a first of the projections to correct the angular position of the first projection whereat the correcting means is into contact with a second of the projections disposed adjacent the first projection, and said first drive means being operative to retract said correcting means out of contact with said projections; means reciprocally movable and capable of being into contact with the second projection for detecting the position of the second projection; a second drive means drivingly connected to said position detecting means for reciprocating the same, said second drive means being operative to advance said position detecting means, when said correcting means is in contact with the first and second projections, to bring the position detecting means into contact with the second projection, and said second drive means being operative to retract said position detecting means out of contact with the second projection; a first detecting means for detecting the displacement of said correcting means and producing a signal; a second detecting means for detecting the displacement of said position detecting means and producing a signal; and means receiving said signals from said first and second detecting means for calculating the position of the center of rotation of said rotary surface.

Additional and other objects and advantages of the invention will become evident from the description set forth hereinafter when considered in conjunction with the accompanying drawings.

BRIEF DESCRIPTION OF THE DRAWINGS

FIG. 6 is a diagram for explaining the operational principle of the apparatus of the invention;

DESCRIPTION OF THE PREFERRED EMBODIMENT

Figure 1:
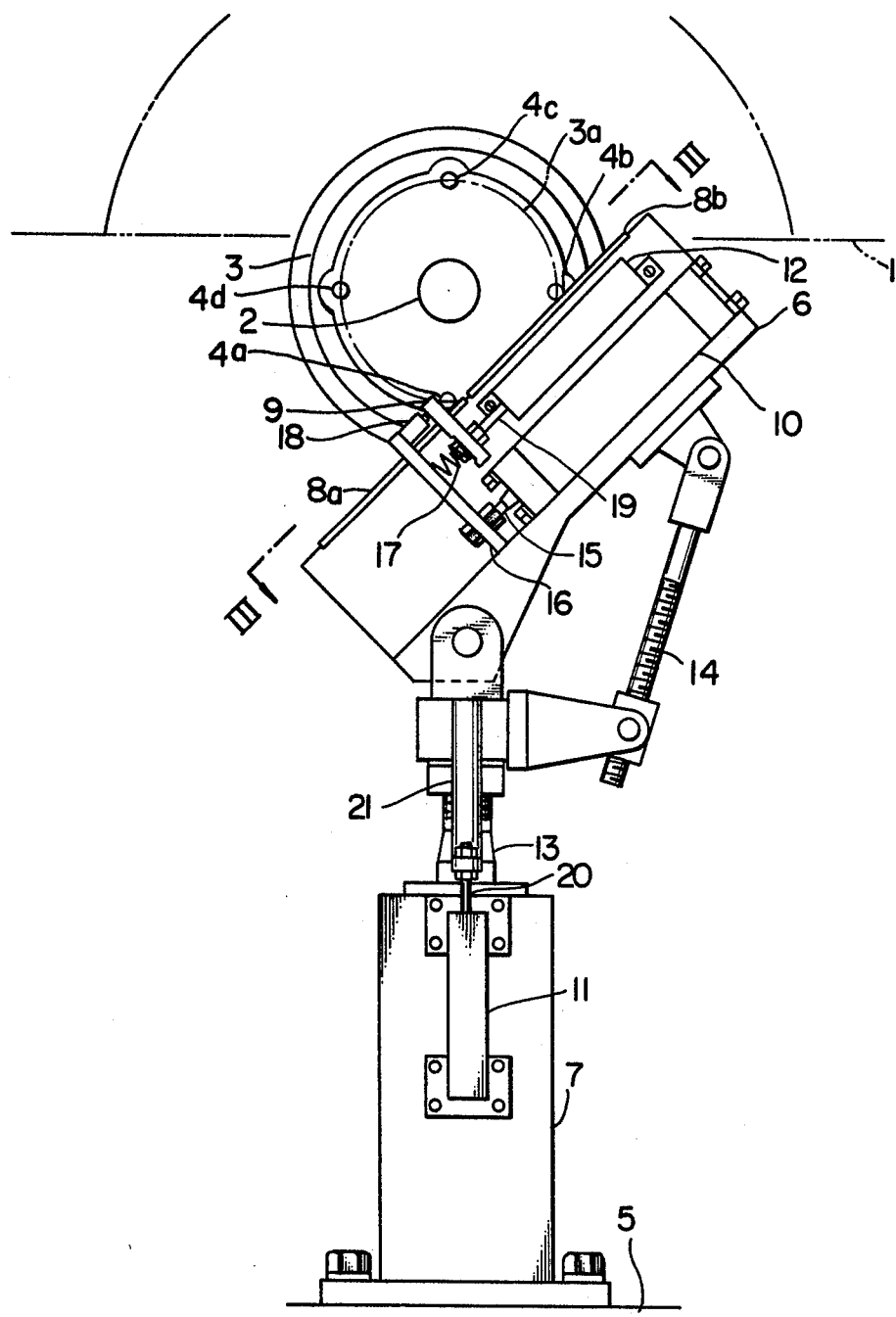
FIG. 1 is a front view of the position detecting apparatus comprising one embodiment of the invention.
Figure 2:
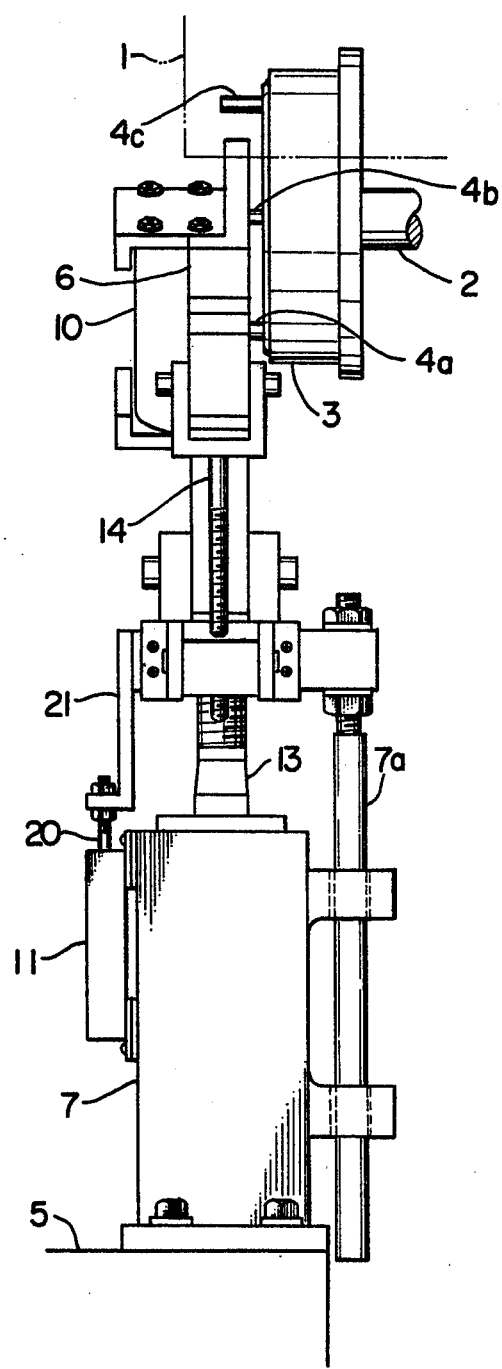
FIG. 2 is a right side view of the apparatus according to the invention shown in FIG. 1.

The position detecting apparatus according to the invention is shown in its entirety in FIG. 1 and FIG. 2. In the figures, a chassis 1 of a motor vehicle is conveyed by a conveyor in a motor vehicle production line. Disposed on the underside of the chassis 1 are axles 2 (only one is shown) each having a hub 3 attached to either end thereof (only one hub is shown). The hub 3 has a plurality of hub bolts 4a to 4d extending at right angles to the rotary surface of the hub 3 and threadably connected to the hub 3 in such a manner that the hub bolts 4a to 4d are disposed on a concentric pitch circle 3a and are angularly equidistantly spaced apart from one another. In the embodiment shown and described herein, the hub 3 has four hub bolts attached thereto.

In power transmission systems adopted by motor vehicles nowadays, the majority of types of vehicles are operated by the rear-wheel drive system. In the case of motor vehicles of this drive system, no problem arises in regard to the rear wheels, but the front wheels should have a steering angle and a camber angle which must be correctly adjusted. When the motor vehicles are in the process of being assembled, the camber angle of the front wheels is in a range from 3° to 6°, while the steering angle can be regulated as by pushing in the preliminary stage of the operation. Thus these angles have no important bearing on the wheel mounting and nut tightening operations when these operations are performed.

The apparatus according to the invention for detecting the position of the center of rotation of each of the hubs 3 attached to the chassis 1 conveyed by the conveyor along the production line and having the hub bolts 4a to 4d attached thereto will now be described. The systems for detecting the position of the center of rotation of the hub 3 having the hub bolts 4a to 4d can be broadly classified into a non-contact system and a contact system. In the present invention, a contact system of detection is adopted because this system has the advantage of being higher than the other system in the degree of precision with which the position of the center of rotation of the hub 3 is detected. The parts to be contacted for detecting the position of the center of rotation may be each axle, an outer periphery of each brake drum and hub bolts. In the present invention, the hub bolts have been selected as the parts to be contacted because they can be directly contacted and can provide all the information necessary for mounting a wheel onto the hub.

The position detecting apparatus according to the invention is arranged on a base 5 disposed in proximity to a conveyor means (not shown) for conveying the chassis 1. According to the invention, the hub bolts 4a to 4d about the axle 2 of the chassis 1 are positioned in their predetermined angular positions, and then the horizontal and vertical positions of the center of the hub 3 are detected. More specifically, the position detecting apparatus according to the invention comprises a position correcting member 6 adapted to correct the angular positions of the hub bolts 4a to 4d, a first cylinder 7 for reciprocating the position correcting member 6, sensors 8a and 8b for detecting the contact between the hub bolts 4a to 4d and the position correcting member 6, a position detecting plate 9 for detecting the positions of the hub bolts 4a to 4d, a second cylinder 10 for reciprocating the position detecting plate 9, a first detector 11 for detecting the displacement of the first cylinder 7, and a second detector 12 for detecting the displacement of the second cylinder 10.

The first cylinder 7 is mounted vertically on the base 5 and receives therein for reciprocatory movement a piston rod 13 which mounts at one end thereof the position correcting member 6 which is held in a predetermined position by means of a reinforcing rod 14. Upon actuation of the first cylinder 7, the position correcting member 6 is moved upwardly and downwardly as the piston rod 13 extends outwardly from the first cylinder 7 and is withdrawn thereinto. The vertical movement of the position correcting member 6 is guided by a guide rod 7a (See FIG. 2). The position correcting member 6 has an upper surface which functions as a surface which is brought into contact with the hub bolts 4a to 4d. The upper surface of the correcting member 6 makes an angle of 45° with the longitudinal axis of the cylinder 7 in order to position the hub bolts 4a to 4d in their predetermined angular positions around the axle 2 in which in the present embodiment a line passing through the diametrally opposed two of the hub bolts 4b and 4d, or 4a and 4c is made horizontal, and in order to decrease the force with which the position correcting member 6 is moved upwardly by the first cylinder 7.

Figure 3:
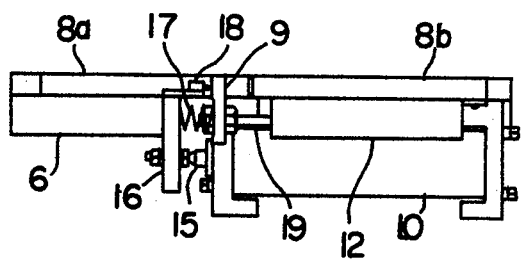
FIG. 3 is a fragmentary view seen in the direction of arrows III—III in FIG. 1.

The position correcting member 6 has in a portion of upper surface thereof the sensors 8a and 8b which are embedded therein for detecting the contact of the upper surface of the position correcting member 6 with the adjacent two of the hub bolts 4a to 4d as shown in FIG. 3. The sensors 8a and 8b are electrically connected to each other in such a manner that, when the hub bolts are brought into contact with the sensors 8a and 8b, the sensors produce a signal which causes the piston rod 13 to stop in its outwardly extending movement. The position detecting plate 9 which is movable in a direction parallel to the upper surface of the position correcting member 6 is adapted to be driven, through a connector 16 and a spring 17, by a piston rod 15 of the second cylinder 10 rigidly secured to one side of the position correcting member 6. The piston rod 15 of the second cylinder 10 stops its inwardly with drawing movement when a limit switch 18 senses that the position detecting plate 9 is brought into contact with any one of the hub bolts 4a to 4d. The limit switch 18 is mounted on the connector 16.

The displacement of the position detecting plate 9 is detected by the second detector 12, which may be a linear potentiometer, for example, and converted into an electric signal. The second detector 12 is secured to one side of the position correcting member 6 and includes a rod 19 which is connected to the connector 16. The vertical displacements of the sensors 8a and 8b are detected by the first detector 11, which may be a linear potentiometer, for example, and converted into an electric signal. The first detector 11 is secured to one side of the first cylinder 7 and includes a rod 20 which is connected to the piston rod 13 of the first cylinder 7 through a fork end 21.

Figure 4:
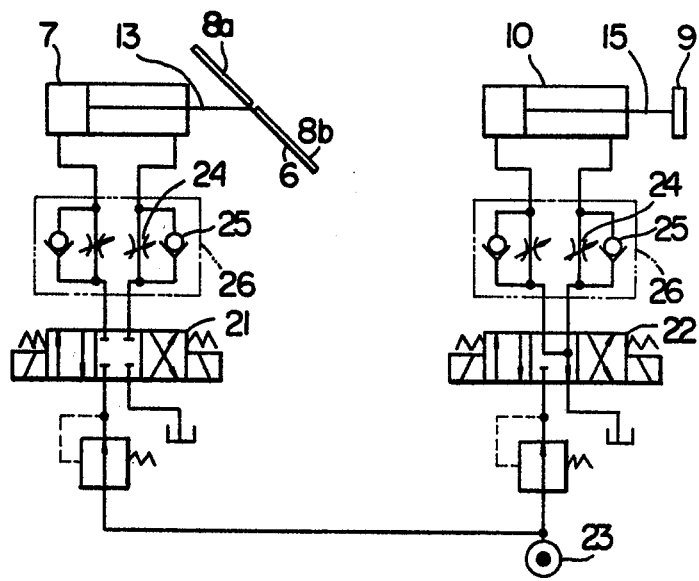
FIG. 4 is a diagram showing a hydraulic circuit used in the apparatus according to the invention.

FIG. 4 shows a hydraulic circuit used for actuating the first cylinder 7 and the second cylinder 10. As can be seen in this figure, the first cylinder 7 and the second cylinder 10 receive a supply of pressurized oil from a hydraulic power source 23 through valves 21 and 22 and check valve means 26, 26 of the flow control type each comprising an orifice 24 and a check valve 25 respectively.

Figure 5A:
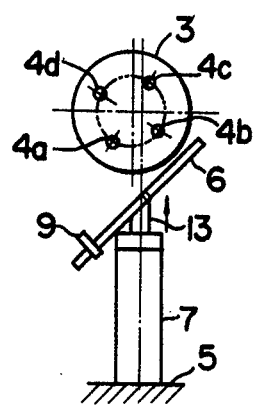
FIG. 5(a) to FIG. 5(f) are schematic views in explanation of the principle of operation of the apparatus according to the invention.
Figure 5B:
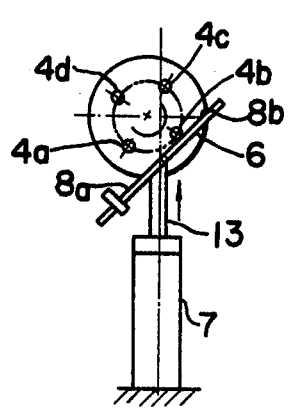

Operation of the apparatus in accordance with the invention will now be described. The base 5 moves synchronously with the chassis 1, and when the base 5 moves into a position which is just under the hub 3 [FIG. 5(a)], the first cylinder 7 is actuated so as to cause the piston 13 to extend outwardly and move the position correcting member 6 upwardly. One of the hub bolts 4a to 4d or the hub bolt 4b, for example, is brought into contact with the upper surface of the position correcting member 6 which is being moved upwardly by the cylinder 7 [FIG. 5(b)]. This causes the hub 3 and the axle 2 to be rotated in the direction of an arrow in FIG. 5(b) by the push-up force of the first cylinder 7. Upon the hub bolts 4a and 4b being brought into contact with the sensors 8a and 8b, respectively, on the upper surface of the position correcting member 6 [FIG. 5(c)], the first cylinder 7 is stopped through an electric circuit connected to the sensors 8a and 8b, with the result that the position correcting member 6 stops its upward movement. Thus the angularly rotated positions of the hub bolts 4a to 4d about the axle 2 can be corrected to a predetermined value. In this embodiment, the value is such that the line connecting the hub bolt 4b to the hub bolt 4d is parallel to the horizontal.

Figure 5C:
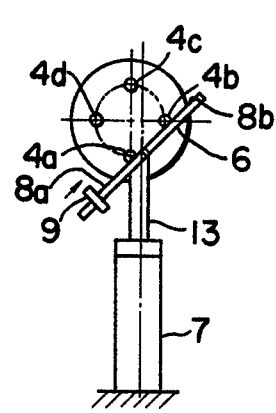
Figure 5D:
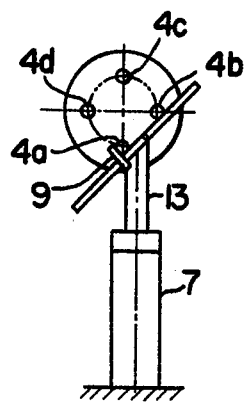

Then the second cylinder 10 is actuated, so that the position detecting plate 9 is moved obliquely upward through the connector 16 and the spring 17 [FIG. 5(c)]. Upon the position detecting plate 9 being brought into contact with the hub bolt 4a, the limit switch 18 is closed and the piston rod 15 of the second cylinder 10 stops [FIG. 5(d)].

In this case, the distance covered by the upward movement of the piston rod 13 of the first cylinder 6 or the displacement of the sensors 8a and 8b is detected by the first detector 11. As shown schematically in FIG. 6, this detection signal is denoted by $Y_1$. Also, if the output of the second detector 12 for detecting the displacement of the position detecting plate 9 is denoted by $l$, position coordinates X and Y of the center $Os$ of the axle 2 of the hub 3, to which the hub bolts 4a to 4d are secured, with respect to the coordinate center $Oc$ can be expressed by the following formulas:

$$X = (l - r - a) \cos \theta + (a + r) \sin \theta \quad (1)$$

$$Y = Y_1 + Y_2 = Y_1 + [(a + r) \cos \theta - (l - a - r) \sin \theta] \quad (2)$$

where $r$ is the radius of each of the hub bolts 4a to 4d; $a$ is one half the length of the distance between the adjacent two hub bolts; and $\theta$ is the angle of inclination of the sensors 8a and 8b with respect to the horizontal.

Figure 7:
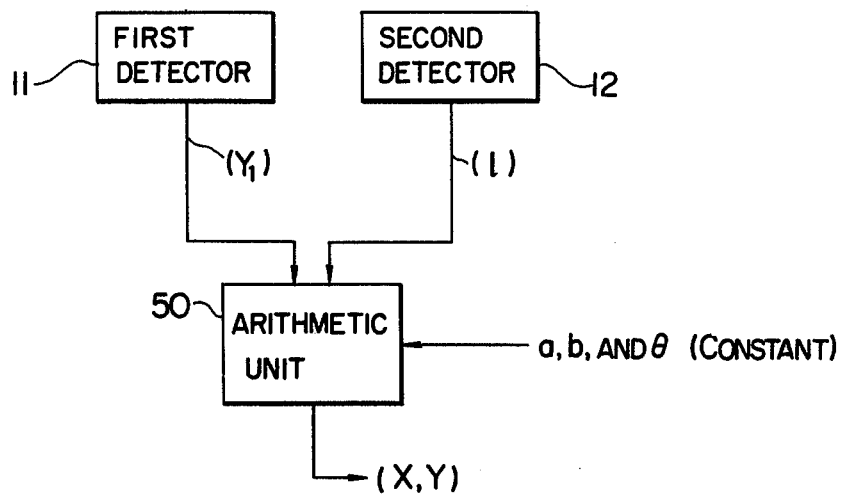
FIG. 7 is a block diagram showing an arrangement of detectors and arithmetic unit.

Since the values of $r$, $a$ and $\theta$ are constant, the values of the position coordinates X and Y expressed by these equations can be calculated by an operational device 50 as shown in FIG. 7 on the basis of the output signal $Y_1$ of the first detector 11 and the output signal $l$ of the second detector 12. Thus, if the position of the center of each of wheel gripping and nut tightening devices (not shown) is controlled by operating these devices by utilizing the signals of the coordinates X and Y, it is possible to automate the operations of mounting wheels onto the vehicle hubs and tightening the nuts.

Figure 5E:
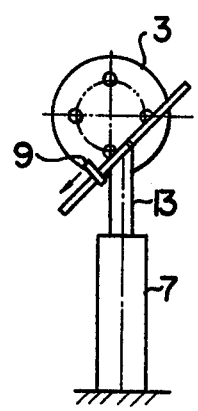
Figure 5F:
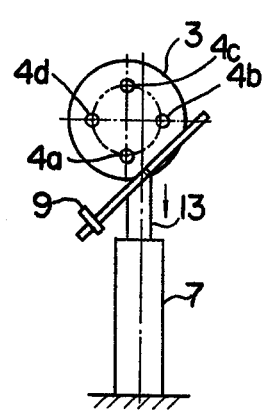

After the position of the center of the hub 3 having the hub bolts 4a to 4d has been detected as described hereinabove, the position detecting plate 9 is moved obliquely downwardly [FIG. 5(e)], and the piston 13 of the first cylinder 7 is inwardly withdrawn into the cylinder 7 [FIG. 5(f)]. In this way the position detecting operation is performed.

Figure 8:
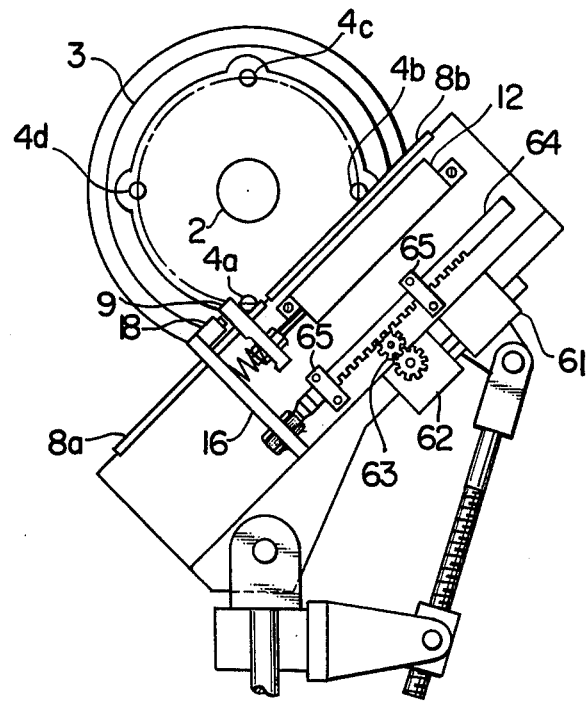
FIG. 8 is a view showing a modification of second drive means.

In the embodiment shown and described hereinabove, a cylinder is used as the second drive means 10. It is to be understood, however, that it is possible to replace the cylinder 10 by an arrangement comprising a motor 61, a pinion 63 adapted to be rotated by the motor 61 through a gear box 62 and a rack 64 maintained in meshing engagement with the pinion 63 as shown in FIG. 8. The rack 64 is guided by guides 65 in its sliding movement.

Also, in the embodiment shown and described hereinabove, the angle of inclination of the upper surface of the position correcting member 6 with respect to the horizontal has been set at 45° so that the line interconnecting the diametrically oppositely located two hub bolts may be parallel to the horizontal. Since the value of this angle of inclination greatly influences the degree of accuracy with which calculation is carried out when the position of the center of the axle is detected and calculated, it is to be understood that the angle of inclination of the upper surface of the position correcting member 6 is not limited to 45°. Preferably, this angle of inclination is selected by taking into consideration the accuracy with which calculation can be performed.

In this invention, the number of the hub bolts is not limited to four. The apparatus in accordance with the invention can have application, for example, in wheel hubs having five, six or eight hub bolts attached thereto also.

As described hereinabove, the invention enables correction of the positions of the hub bolts and the detection of their positions to be performed substantially simultaneously, so that the position of the center of the hub having the hub bolts attached thereto can be detected. Thus, by utilizing the detection signals, it is possible to readily bring the position of the center of each of the wheel mounting device and the nut tightening device into index with the position of the center of the hub having the hub bolts attached thereto. In this way, the apparatus according to the invention enables wheel mounting and nut tightening operations to be performed automatically without requiring manual attention.

We claim:

1. An apparatus for detecting the position of the center of rotation of a rotary surface having secured thereto a plurality of projections disposed on a concentric pitch circle in said rotary surface and angularly equidistantly spaced apart from each other, comprising:

position correcting means having a surface movable toward and away from said projections for correcting the angular positions of said projections by rotation of said rotary surface;

first drive means drivingly connected to said position correcting means for moving the position correcting means toward said projections and into engagement with a first one of said projections to rotate said rotary surface until a second one of said projections adjacent to said first projection comes into engagement with said surface of said position correcting means and for thereafter moving said position correcting means away from said projections to be out of engagement with said first and second projections;

position detecting means mounted on said position correcting means and movable along said surface of said position correcting means toward and away from said first and second projections which are in engagement with the surface of said position correcting means for detecting the position of one of said first and second projections;

second drive means drivingly connected to said position detecting means for moving said position detecting means along the surface of said position correcting means toward said first and second projections which are in engagement with said surface of said position correcting means until it comes into engagement with one of said first and second projections, and for thereafter moving said position detecting means along said surface of said position correcting means away from said projections to be out of engagement with any projection;

first displacement detecting means for detecting the displacement of said position correcting means during its movement into engagement with said projections and producing a first signal proportional to said displacement;

second displacement detecting means for detecting the displacement of said position detecting means during its movement into engagement with one projection and producing a second signal proportional to said displacement; and means receiving said first and second signals from said first and second displacement detecting means for calculating the position of the center of rotation of said rotary surface.

2. An apparatus as claimed in claim 1, further comprising means for detecting the contact of said correcting means with said first and second projections and for stopping the advancing movement produced by said first drive means in response thereto.

3. An apparatus as claimed in claim 2, further comprising means for detecting the contact of said position detecting means with said second projection and for stopping the advancing movement produced by said second drive means in response thereto.

4. An apparatus as claimed in claim 1, wherein said rotary surface is disposed in a vertical plane, said correcting means being reciprocally movable vertically and said surface thereof which is capable of being moved into engagement with said first and second projections is inclined with respect to the horizontal.

5. An apparatus as claimed in claim 1, wherein said first drive means comprises a hydraulic cylinder and piston assembly, and said correcting means is connected to a piston of said assembly.

6. An apparatus as claimed in claim 5, wherein said second drive means comprises a hydraulic cylinder and piston assembly, and said position detecting means is connected to a piston of said assembly.

7. An apparatus as claimed in claim 5, wherein said second drive means comprises a rack and pinion assembly, and a motor for rotating a pinion of said assembly.

* * * * *